United States Patent [19]

Fletcher et al.

[11] 4,103,712

[45] Aug. 1, 1978

[54] POSITIVE ISOLATION DISCONNECT

[76] Inventors: James C. Fletcher, Administrator of the National Aeronautics and Space Administration, with respect to an invention of; Morley V. Friedell, Stevensville, Mont.

[21] Appl. No.: 750,792

[22] Filed: Dec. 15, 1976

[51] Int. Cl.² .............................................. F16L 29/00
[52] U.S. Cl. ........................... 137/637.05; 137/614.06; 251/149.9; 285/326; 285/359
[58] Field of Search ...................... 137/614.06, 637.05; 251/111, 149.9; 285/309, 312, 314, 326, 359, 394, 395

[56] References Cited

U.S. PATENT DOCUMENTS 2,773,706  12/1956  Leavell ............................ 137/637.05

FOREIGN PATENT DOCUMENTS 2,504,760  8/1975  Fed. Rep. of Germany ...... 137/614.06
  873,671  7/1961  United Kingdom ................ 137/637.05

Primary Examiner—Gerald A. Michalsky
Attorney, Agent, or Firm—Carl O. McClenny; John R. Manning; Marvin F. Matthews

[57] ABSTRACT

A disconnect composed basically of two halves each consisting of a poppet valve operable to isolate fluid with essentially zero fluid loss. The two halves are coupled together by a quickly releasable coupling which may be either a coupling ring tightened or loosened by a twisting motion, or a clamp operated by a pivoted handle. In either case an interlock device is provided to prevent disconnecting the two halves until both valves are in closed condition.

The "positive" feature of the device is one requiring a valve closing step before a disconnect step, and takes structural form in an eccentric lobe mounted on the valve operating stem. If some obstruction prevents the poppet from moving to its seat, the eccentric lobe cannot be rotated to the closed position, and the interlock prevents a disconnect.

3 Claims, 15 Drawing Figures

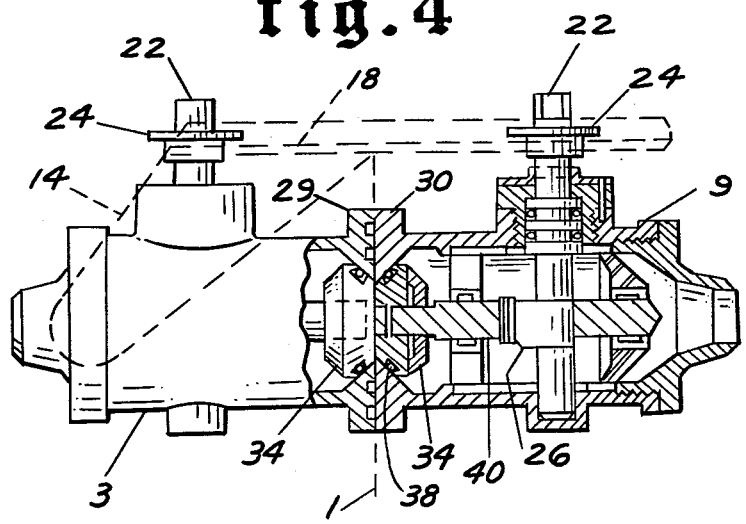
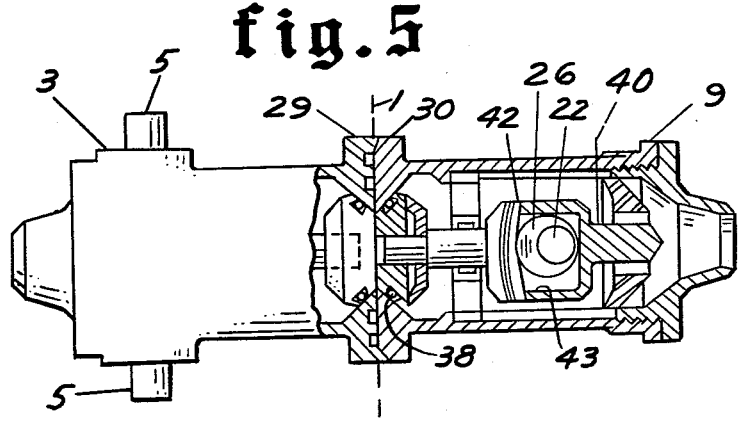
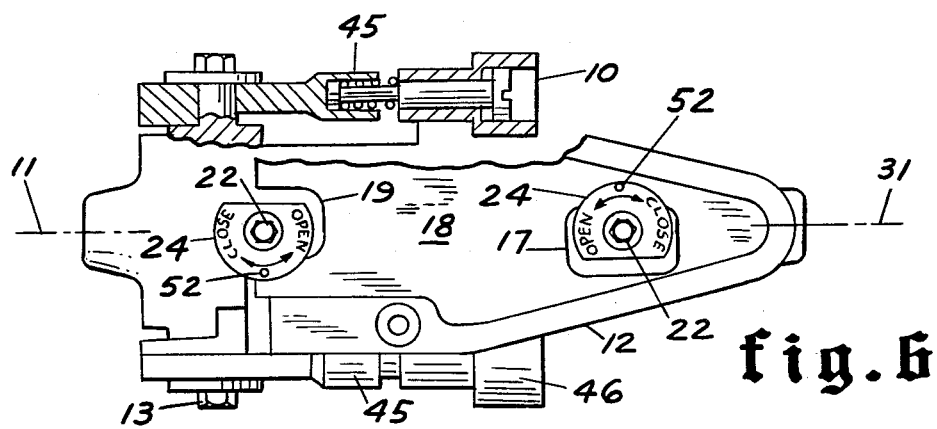

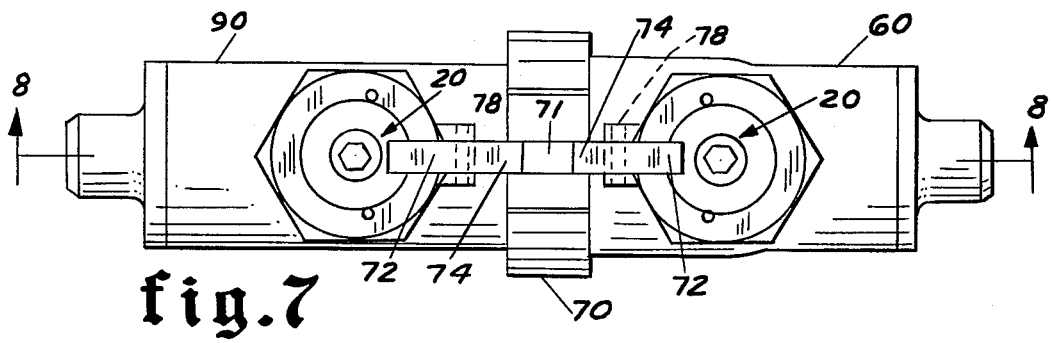
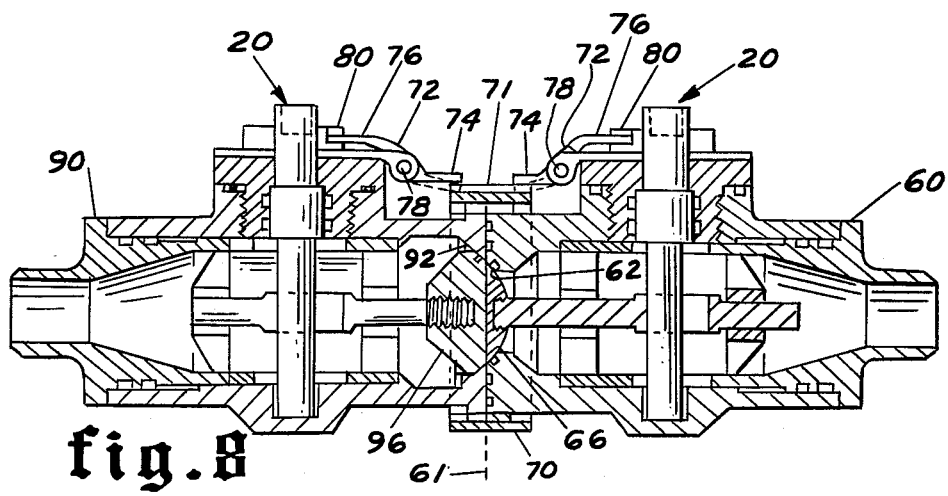
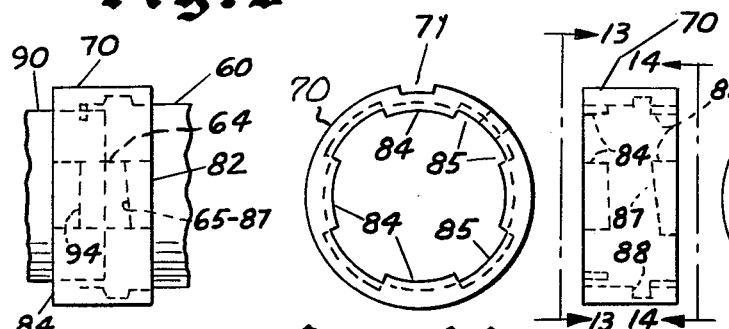
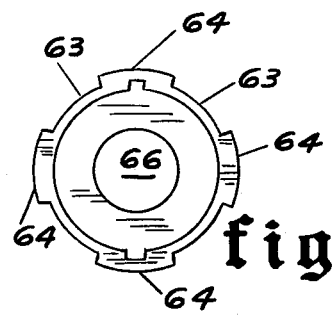
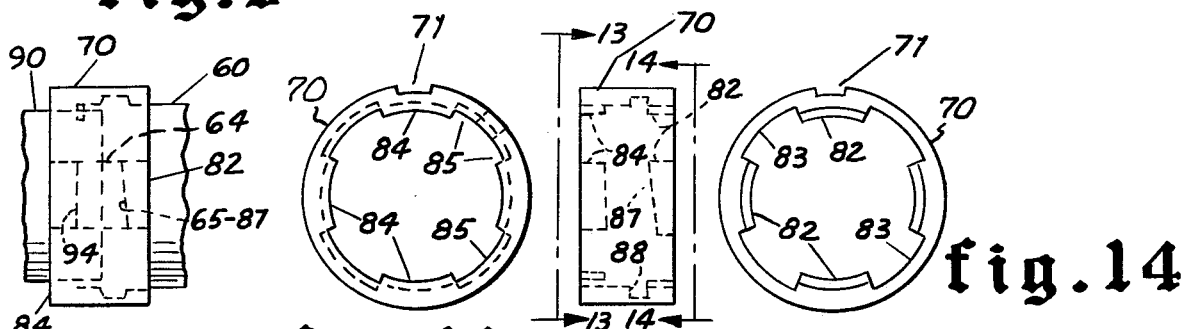

POSITIVE ISOLATION DISCONNECT

ORIGIN OF THE INVENTION

The invention described herein was made in the performance of work under a NASA Contract and is subject to the provisions of Section 305 of the National Aeronautics and Space Act of 1958, Public Law 85-568 (72 Stat. 435; 45 USC 2547).

BACKGROUND OF THE INVENTION

1. Field of the Invention

The present invention is concerned with means for disconnecting equipment from a fluid flow line. More particularly, it provides a means for rapidly and positively disconnecting a fluid conduit by the operation of one or more valves which are positively closed to block the flow of fluid prior to disconnecting one part of the fluid line from another.

2. Description of the Prior Art

Previous quick-disconnects of the positive isolation variety have been of the type which required relative rotational motion between the two halves for effecting a pressure seal, thereby resulting in excessive wear between rubbing parts. Mechanical advantage for effecting the seal was achieved by ramp-type closure mechanisms.

SUMMARY OF THE INVENTION

It is the principal object of the present invention to provide a disconnect which may be readily operated to separate the two halves of a flow line, without spillage, and will continue to do so through long periods of service. Stated of another way, embodiments of the invention will operate to open up the flow line only when the fluid on each side of the separation has been positively isolated so that there will be no leakage. Subsidiary objects are to provide (1) a readily disconnected clamping means, (2) valve and valve seat arrangements in which the closed or seated valves does not trap any fluid which would be spilled when the valves are separated, (3) disconnect halves which, after a disconnecting step, may be readily separated from one another by essentially only vertical motion, and (4) means for interlocking the clamping means to the valve operating means so that the clamping means cannot be disconnected except when both valves are closed. Another subsidiary object is a means to lock the valves in closed position when the disconnect has been operated, i.e., when the flow line is open. Other objects are to provide disconnects which may be used in the handling of hazardous fluids, are of small mass in relation to the flow rate of the fluid being transported, and are relatively simple and inexpensive to manufacture.

These objects are achieved in embodiments of the present invention which include a pair of valve housings that are elongated along the direction of the flow line and are disposed face-to-face, so that the poppet valves when closed are in contact with one another at a fluid tight interface. Each poppet includes a flat head having a conical edge which engages a similar conical surface formed in the housing seat, a shaft secured to the head and extending backwardly into the housing along its centerline, and a bifurcated portion of such shaft which receives a transversely extending operating stem. The portion of the operating stem received in the opening in the bifurcated portion of the poppet shaft has secured thereon an eccentric lobe which retains contact with the poppet shaft and determines its position. The operating stem rotates only 180° between extreme positions, one such position pushing the poppet forward to its closed position while the other extreme position of the operating stem causes the poppet to be fully retracted. In this manner a knob may be provided on the external part of the operating stem to furnish a visual indication of the position of the poppet head, and such knob may also be used to furnish part of the interlock system.

Two clamping structures are disclosed, one of which utilizes a set of circumferentially spaced splines or dog ears extending radially outwardly from the body of each valve housing at their interfacing ends, the ear portions on the two housings being axially aligned. Also provided is a coupling ring having two sets of similar dogs extending inwardly from its interior surface, the two sets being spaced apart by the maximum axial distance from one set of flanges on a valve end to the set on the other valve end. The back faces of one set of dog ears on a valve end are chamfered, as are one set of corresponding and registering surfaces on the coupling ring, these being provided to furnish tightening action as the coupling ring is moved into position axially and then rotated circumferentially to force the two sets of flanges on the valve ends against one another.

The other means for clamping the two valves together consists of a pivoted handle and a clamping yoke. The handle is a parallel pair of cross-linked legs straddling one of the valve housings and having one set of their ends pivotally and eccentrically mounted on a pair of stub shafts extending transversely from opposite sides of such housing. The clamping yoke is a U-shaped member in which the pair of parallel arms (of the U) lie on opposite sides of the same valve body and extend parallel to its axis below the pivoted handle, and have one of their pairs of ends joined together by the cross bar at the interface of the two valves. This cross member fits behind a radially extending flange on the other valve body adjacent the interface between the two, while the free ends of the parallel legs are provided with a pair of transverse openings to receive a pair of bosses on the legs of the pivoted handle. These bosses are cylindrical and receive cylindrical stub shafts extending laterally and integrally from the valve housing, but the openings in the bosses receiving such stub shafts are eccentrically disposed, so that rotation of the handle to its closed position forces the ends of the parallel legs of the yoke in a direction away from the interface of the two valves, causing a clamping action. At the other extremity of rotation, this tension is released, removing all clamping action and permitting the two valves to separate.

When the handle is in one extreme position, that of tightening the two valves together, a portion of the handle is horizontal and is disposed over the operating stems of the two valves. Cut-away notches in a plate secured on the handle permit upward and downward motions of the handle, but only when the notches are aligned with cut-away contours of a pair of indicating knobs secured on the operating stems. Thus, when the valves are fully closed (both poppets sealingly seated in their seats), the knobs register with the openings in the handle and the handle may be raised to disconnect the two valves through its release of the clamping mechanism. When either one of the valves is not fully closed, a portion of this knob overlies a portion of the handle plate and the handle cannot be lifted.

In the other form of clamping mechanism, using the coupling ring, the coupling ring itself is provided with one or more axially extending external slots. For each valve a pivoted lever engages one of these slots at one end, while the other end of the same lever engages an external ramp formed on a member mounted on the stem. Rotation of the stem to the open position causes pivoting of the lever and engagement of the one end in the clamp, while rotation of the valve stem in the other direction pivots the lever in the opposite direction and permits it to clear the slot. To ensure that the valves are not disconnected by rotation of the coupling ring unless each valve is fully closed, the lever is not permitted to clear the slot in the coupling ring until its corresponding valve is fully closed.

A refinement consists of a structure to prevent rotation of the operating stem away from a position corresponding to the valve closed position when the two valves are separated. In its simplest form, this consists of a spring loaded plunger seated in the valve housing adjacent the operating stem, the spring being biased to cause the plunger to protrude and engage the operating stem against rotation and being releasable by pushing the plunger downward to compress the spring. When the valves are connected together, the handle of the first described interlock means pushes down on the plunger to accomplish this purpose.

BRIEF DESCRIPTION OF THE DRAWING FIGURES

The present invention may perhaps be more understood by reference to the attached drawing, in which:

FIG. 4 is the side elevation of the same disconnect, partially in section, the clamping means being omitted except that the closed position of the operating handle of the clamp is shown in phantom.

FIG. 5 is a plan view of the same embodiment, partially in section, the clamping means being omitted altogether in the interest of clarity.

FIG. 6 is a plan view of the same invention corresponding to the position of the parts shown in FIG. 1. This view shows both of the valves open, as indicated by the positions of the indicating knobs on the operating stems.

FIG. 7 is a plan view of a second preferred embodiment, showing the valve halves clamped together, the valves closed and the interlock means disengaged.

FIG. 8 is a longitudinal section of the same embodiment.

FIGS. 9–15 show details of the coupling between the two halves of the FIG. 7–8 disconnect, FIG. 9 being an elevation of the two halves coupled together prior to adding the coupling ring.

FIG. 10 is an end view from the interface as indicated by the lines and arrows labeled "10—10" in FIG. 9.

FIG. 11 is another end view of the other disconnect half, as indicated by the lines and arrows labeled "11—11" in FIG. 9.

FIG. 12 is a side elevation of the coupling ring, whereas FIGS. 13 and 14 are end views, respectively from left and right in FIG. 12.

FIG. 15 is an elevation showing the two disconnect halves assembled with the coupling ring.

DETAILED DESCRIPTION OF THE DRAWING FIGURES

Figure 1:
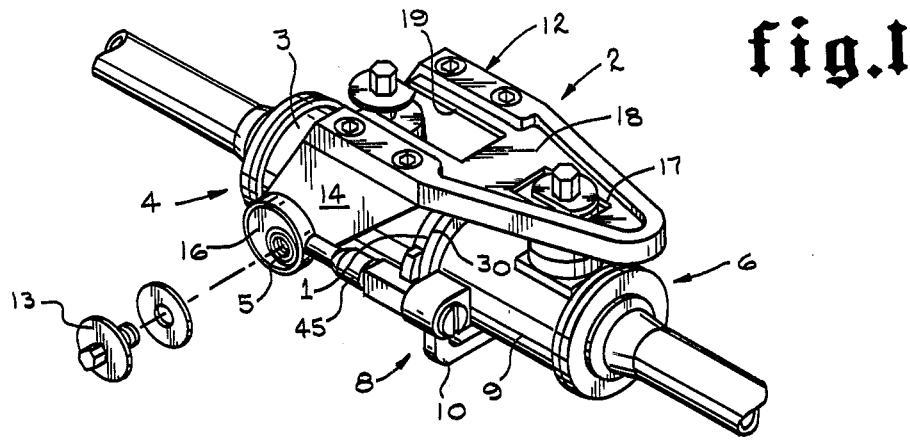
FIG. 1 is a perspective view of a preferred embodiment of a disconnect of the present invention, the two halves of the disconnect being clamped together and the two valves being open, as indicated by the positions of the indicating knobs on the operating stems.
Figure 2:
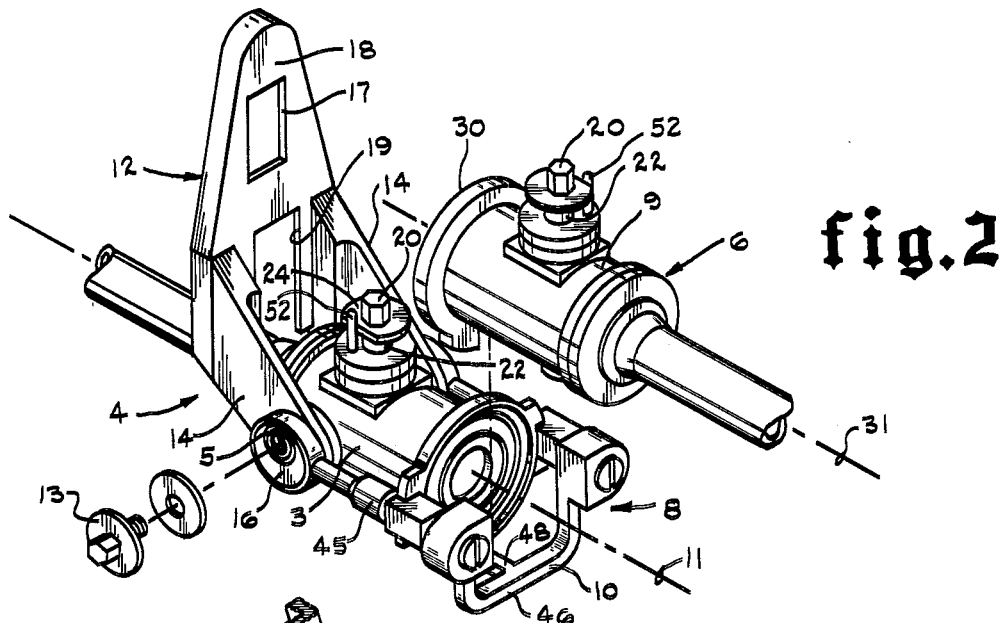
FIG. 2 is a perspective view of the same embodiments, this view showing the two halves of the disconnect unclamped and both valves being closed.
Figure 3:
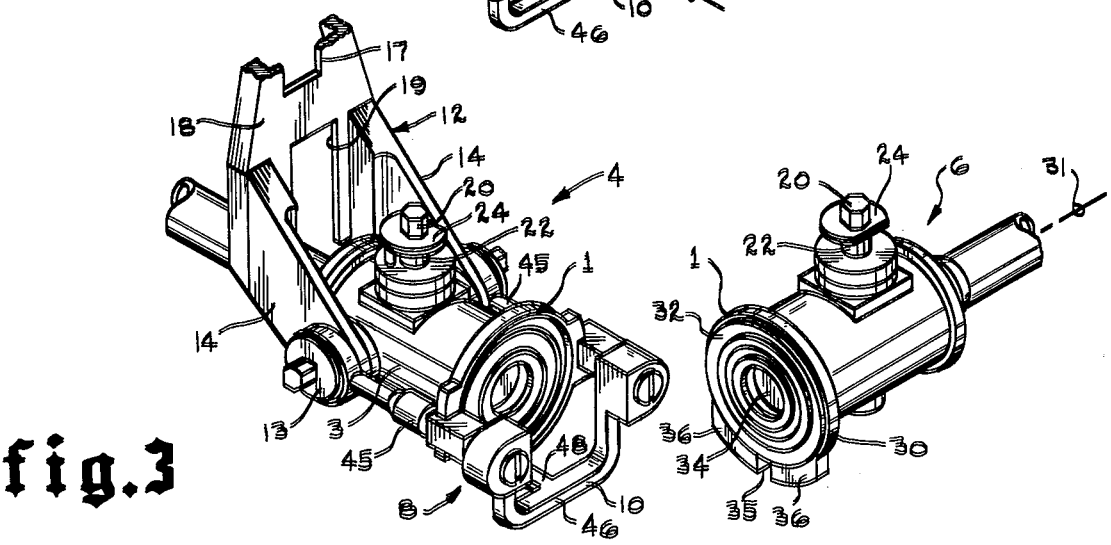
FIG. 3 shows the same disconnect halves, slewed about to obtain a look at the surfaces which form the interface.

The preferred embodiment shown in FIGS. 1–3 of the drawing is an "opposed poppets" type of construction, one in which the poppets in closed or seated position touch or closely abut one another, and in which the poppets move in opposite directions when the valves are opened. Each disconnect 2 consists of the halves 4 and 6, the half 4 on which clamping mechanism 8 is mounted being known as the "line half" while the disconnect half 6 having no clamping mechanism is known as the "component half"; these terms are used simply because, for convenience, the more complicated half of the disconnect is left in a fixed line when a component such as a pump being protected by the disconnect is isolated on both its input and output sides, when the pump is to be removed for replacement or repair. Also visible in these exterior views is the U-shaped clamping yoke 10, forming a part of clamping mechanism 8, and the handle 12 which is used to connect the two halves 4 and 6 together and, alternately, to remove the tension from the clamping yoke 10 to disconnect the two halves. Each disconnect half also has an upwardly protruding operating stem assembly 20, the stem of which extends downwardly in the valve housing, as shown in further views.

In FIGS. 1–3 it will be seen that the component half 6 of the disconnect terminates in an outwardly extending flange 30 and that the end face 32 of the valve is normal to the axis 31 of the valve, which is shown closed with the poppet head 34 seated in the indicated opening in housing 6, flush with end face 32. Assuming a horizontal orientation, the lower portion of flange 30 is bifurcated to form feet 36, separated from one another by a notch 35 which is used in assembling the halves and clamping together. The operating stem 22 is shown extending above housing 9 of half 6, and on it is mounted the indicating knob 24.

The same views show the pair of coaxially aligned stub shafts 5 extending integrally from valve housing 3, normal to its longitudinal center line 11. On these fixed cylindrical shafts are mounted the two pivot legs 14 of handle 12, each shaft 5 being received in a cylindrical opening in a cylindrical boss 16 formed on the end of each leg 14 and extending radially outwardly therefrom. Note in particular that the opening in boss 16 receiving shaft 5 is eccentric with respect to the boss; for the closed (horizontal) position of handle 12, the opening for shaft 5 is displaced from the center of the boss 16 in the direction toward the interface 1 between the two valves, as shown in FIG. 1. When the handle is lifted to the position shown in FIG. 2, its boss 16 rotates to the indicated position wherein it no longer exerts a tensile force on yoke 10.

Yoke 10 is a generally U-shaped member consisting of a pair of parallel arms 45 and a crossarm 46 joining arms 45 at one set of their ends. As best shown in FIG. 6, the parallel arms 45 are made of parts permitting some adjustment in their lengths, and at their free ends they are provided with aligned transverse openings receiving the bosses 16 of pivot legs 14. Crossarm 46 is shaped to extend under valve housing 9 and lie behind its flange 30, as shown in FIG. 3, so that a tensile force in the arms 45 will pull the valve housings together. The rib 48 at the center of crossarm 46 is received in notch 35 of flange 30 as an assembly aid.

The pivot legs 14 of handle 12 are cross-linked by plate 18, and thus always rotate in unison. Plate 18 is provided with apertures 17 and 19, the former permitting the handle to be closed around the operating stem assembly 20 of disconnect half 6 while aperture 19 surrounds the operating stem assembly 20 of disconnect half 4. The size, shape and location of these apertures is critical, and for this it should be noted from FIG. 4 that in closed position the top surface, of plate 18 lies just below the nether surface of the two indicating knobs 24 which are mounted on the operating stems 22.

The operating mechanisms are best seen in FIGS. 4-6. Except for features already pointed out, valve housings 3 and 9 are substantially identical, and the same is true of the poppet valves and operating assemblies. Each poppet head 34 has a conical edge 38 which mates with a similarly shaped seat in the interface end of the housing, and is securely mounted on the end of a poppet shaft 40 mounted on the indicated guides for reciprocating axial motion within the housing. At about its midsection, poppet shaft 40 is bifurcated at 42 to define an opening receiving operating stem 22 and a cam lobe 26 mounted on such stem. FIGS. 4 and 5 show stem 22 and cam lobe 26 in the fully closed position, with poppet head 34 fully seated. Rotation of these members in the appropriate direction (counter-clockwise in FIG. 5) will slide poppet shaft 40 away from interface 1, unseating poppet head 34 and permitting flow through the seat opening. This rotation may be continued for 180 degrees, and must be reversed to slide the shaft in the opposite direction, to close the valve.

An indicating knob 24 is securely mounted on the external portion of operating stem 22, protruding above the valve housing. As shown in the figures, knobs 24 are basically circular discs with one portion flattened or cut away, as by a chordal saw cut. Such a shape lends itself well to the simple rectangular apertures 17 and 19 in plate 18 of handle 12, wherein the center of each aperture is slightly offset from the vertical axis of the operating stem 22. In the closed valve positions indicated in FIG. 1, there is some clearance between the outer periphery of each indicating knob 24 and the opening 17 or 19. On the other hand, when either valve is open, some portion of an operating knob 24 will overlie a portion of plate 18, making it impossible to raise handle 12. FIG. 6 shows the extreme or fully open position of both valves, but it will be evident that before lifting handle 12 each knob 24 must be turned until its flat edge is parallel to that one of the longer sides of the rectangular opening 17 or 19 lying closer to the axis of the operating stem and that this corresponds to a fully closed position of the valve. Thus the interlock prevents an operator from inadvertently disconnecting the two valves when either is in the open condition; the fluid in each of them must be isolated before a disconnect is possible.

An auxiliary feature is designed to insure such isolation after the valve halves have been properly disconnected, and is illustrated in FIGS. 2 and 6. A plunger 52 on the end of a small compression spring (not shown) mounted in a recess in the top of the housing is biased so that it normally protrudes above the surface, adjacent to knob 24 and interfering with it. The plunger 52 only pops up beside knob 24 when the latter is in the valve fully closed position, and prevents the valve from being opened until the plunger is depressed. Such depression is accomplished when the valves are being connected together by the closing action of handle 12, since the plate 18 will contact the tops of plungers 52 and push them free of knobs 24, as indicated in FIG. 6.

FIGS. 7-15 illustrate an embodiment varying in several ways from the preferred embodiment already described, including a "tandem poppets" valve mechanism, a coupling in the form of a ring clamp, and a novel interlock. The two valve housings 60 and 90 are virtually identical, and the valve operating mechanisms 20 may be assumed to be the same as previously described. However, in this embodiment both of the conical valve seats 62 and 92 are chamfered or sloped in the same direction, so that in closed position they form a continuous conical surface, as shown in FIG. 8. Looked at from their common interface 61, one seat converges into its housing while the other diverges into its housing, and of course the chamfered edges of the two poppets 66 and 96 are similarly contoured. When the valves are opened, poppet 96 is moved from its flush position at interface 61 to a position within its own housing 90, whereas poppet 66 must be moved out of its own housing 60 and into the same housing that contains poppet 96. Since it is undesirable to let the poppet heads become separated while fluid is moving through the valves, a special tool, not shown, is provided to insure that the operating stems 20 are rotated in unison, i.e., at the same rate. Such tool is essentially an external gear box containing a rack meshing with two identical pinions, each of which engages a like gear on an operating stem 20.

The two disconnect halves 60 and 90 are clamped together by a coupling ring 70 engaging registering sets of splines on the two ends of housings 60 and 90 adjacent interface 61. When the coupling ring 70 is in locking position, its upper portion presents an upwardly facing axial groove 71 adapted to receive the short ends 74 of a pair of interlock levers 72 pivotally mounted at 78 on the upper portions of housings 60 and 90 as shown. The other, longer ends 76 of levers 72 ride on an external cam 80 secured to operating stem 20 for common rotation therewith. Each cam 80 is a ramp wrapped around stem 20, something like a spiral driving surface in certain parking garages. In the position shown in solid outline in FIG. 8 both valves are closed, and the ramp positions are such that levers 72 are cocked so that their ends 74 are raised clear of the groove 71 in coupling ring 70; the coupling ring could be safely manipulated to disconnect the two halves. The dotted line positions of ends 74 shown in the drawing indicate that they have entered the axial groove 71, corresponding to rotation of stems 20 to unseat the poppets 66 and 96, thus locking the coupling ring 70 in place and preventing a disconnect.

FIGS. 9 through 15 are an attempt to illustrate the registering ends of valve housings 60 and 90 and their engagement with coupling ring 70. FIG. 9 is a side elevation of the two ends without the coupling ring, whereas FIGS. 10 and 11 are end views of the two housings. As these views show, each housing end has four equally spaced circumferential splines 64 and 94 extending radially outwardly from its outer surface, each pair of adjacent splines being separated by a groove 63 or 93 of about the same arc length. In connecting the valves, the housing 60 and 90 are butted against each other so that the splines 94 of one housing register with the splines 64 of the other, leaving continuous axial grooves or spaced between the two sets. It should be noted that all of the front and rear surfaces of splines 64 and 94 are normal to the longitudinal axis of the housings with the exception of the rear surfaces 65 of splines 64; these surfaces 65 are chamfered as shown to provide tightening action when engaged with the corresponding internal splines of coupling ring 70.

FIG. 12 is a side elevation of coupling ring 70. while FIGS. 13 and 14 are views looking into FIG. 12 as indicated. From these views it will be evident that adjacent each of its axial ends the ring 70 has a set of circumferentially equally spaced, inwardly extending splines, 82 on the right end and 84 on the left, spaced apart by grooves 83 and 85, and that these two sets of splines are spaced from each other axially by a circumferential groove 88. From FIG. 12 it should be noted that the front and back surfaces of splines 82 and 84 are all normal to the axis of the ring with the exception of the front surfaces 87 of splines 82, which are chamfered to engage and register with the correspondingly chamfered surfaces 65 on the backs of splines 64 on housing 60. Grooves 83, of course, receive splines 64 of housing 90, while grooves 85 receive the splines 94 of housing 90.

FIG. 15 is a side elevation of the two housings 60 and 90 assembled with coupling ring 70, from which it will be evident that, in the locked position shown, splines 82 and 84 of the coupling ring 70 clamp the aligned splines 64 of housing 60 against splines 94 of housing 90. The camming action of the chamfered surfaces 65 and 87 is also indicated, and it will be appreciated that as the coupling ring is rotated into this position (from its axial sliding position wherein its splines 82 and 84 are disposed in the grooves 63 and 93 of the housings) such chamfered surfaces serve as a stop to such rotation or twisting action. Appropriate seals are disposed in the grooves 95 and 97 on one of the facing housing ends.

Having thus disclosed a preferred embodiment of the invention and various modifications thereof, it is not intended that any limit on the invention should be inferred from the specific details set forth. The invention is that of a disconnect which positively isolates the fluid on both sides of the interface, provides leaktight clamping action between disconnect halves, and provides interlocking mechanisms to insure that the fluid on both sides of the interface has been isolated before a disconnect is possible. Many variations will now occur to those skilled in the art, and the present inventor intends to stake his claim to all such variations which accomplish substantially the same results by equivalent structure operating in substantially the same manner, and should not be limited except by the following claims.

I claim:
1. A positive isolation quick-disconnect comprising:
 (a) A pair of axially separable valve housing members having through-bores communicating when said housings are coupled at an interface to form a passage therethrough, wherein the coupled ends of said housings are radially outwardly flanged and spaced away from said interface, and wherein one of said housings is provided with a pair of radially outwardly extending coaxial, fixed stub shafts;
 (b) a poppet valve axially slidable within each of said housings and disposed in coaxial, end-to-end relationship with their abutting ends capable of forming a fluid-tight interface;
 (c) a valve seat in each of said housings for sealingly engaging said valves at said interface;
 (d) an operating stem engaging each of said valves for controlling the positions of said valves, said stems extending through said housings for external manipulation of said valves through their open and closed positions;
 (e) clamping means for selectively connecting and disconnecting said housings, said clamping means comprising (1) a pair of cross-linked pivot legs disposed on opposite sides of said one housing, each said pivot leg having a cylindrical boss with an eccentric opening therethrough for receiving one of said housing stub shafts extending radially therethrough, said eccentric openings being coaxial with one another and said pivot legs being cross linked for common rotation, and (2) a generally U-shaped clamping yoke having a pair of generally parallel arms each with one free end and a crossarm joining the other ends of said parallel arms, said free ends being provided with a pair of opposed, transverse coaxial cylindrical openings for receiving said cylindrical bosses of said pivot legs in rotatable relationship, said parallel arms being generally disposed to straddle said one housing and parallel to the axis thereof, and said crossarm of said yoke being disposed to matingly engage said end flanges of said other housing, said clamping means having a relaxed position in one rotary position of said pivot legs in which no pulling force is exerted through said yoke and said flanges are separated by a gap, and an engaged position in a second rotary position of said pivot legs in which a pulling force is exerted through said clamping yoke to eliminate said gap and thereby clamp said flanges together in sealing, fluid-flow relationship; and
 (f) interlock means between said valve operating stems and said clamping means to permit release of the clamping means only when both of said valves are in the closed position.

2. The disconnect of claim 1 in which said cross link of said pivot legs of said clamping means comprises a plate member having a pair of apertures therethrough and said operating stems protrude from their housing with the same azimuthal orientation and each said operating stem is equipped with an indicating collar which is circular except for one flat edge, said plate member in the engaged position of said clamping means being disposed closely above said valve housings, and below said collars, with said apertures surrounding the two operating stems, said apertures having the same general shape as said indicating collars and dimensions only slightly greater, and being oriented to pass over said collar only when said collars are oriented in positions corresponding to the fully closed positions of said valves, whereby when either valve is partly open one or both of said collars will overlie a portion of said plate adjacent one of said apertures and prevent movement of said plate, thus preventing a disconnect when either valve is open.

3. The disconnect of claim 2 further comprising a plunger pin mounted in each said housing adjacent said indicating collar, said plunger pin having an extended position engaging said collar to prevent rotation of said operating stem and a disengaged or depressed position in which it permits rotation, said plunger pin being moved from extended to depressed position by said clamping means plate as said plate swings into engaged position above the valve bodies.

* * * * *